US009710553B2

(12) United States Patent
Harrenstien et al.

(10) Patent No.: US 9,710,553 B2
(45) Date of Patent: Jul. 18, 2017

(54) GRAPHICAL USER INTERFACE FOR MANAGEMENT OF REMOTELY STORED VIDEOS, AND CAPTIONS OR SUBTITLES THEREOF

(75) Inventors: Kenneth L. Harrenstien, Palo Alto, CA (US); Andrew Philip Gove, Seattle, WA (US); Wei Shao, Seattle, WA (US)

(73) Assignee: Google Inc., Mountain View, CA (US)

( * ) Notice: Subject to any disclaimer, the term of this patent is extended or adjusted under 35 U.S.C. 154(b) by 2007 days.

(21) Appl. No.: 11/754,269

(22) Filed: May 25, 2007

(65) Prior Publication Data

US 2014/0301386 A1    Oct. 9, 2014

(51) Int. Cl.
*G06F 17/30* (2006.01)
*G06F 3/0482* (2013.01)
*H04N 21/43* (2011.01)
*H04N 21/488* (2011.01)

(52) U.S. Cl.
CPC ...... *G06F 17/30849* (2013.01); *G06F 3/0482* (2013.01); *G06F 17/30861* (2013.01); *H04N 21/4302* (2013.01); *H04N 21/4888* (2013.01)

(58) Field of Classification Search
CPC ........... H04N 13/0062; H04N 13/0066; H04N 13/007; G06F 17/30849; G06F 17/30861; G06F 3/0482
USPC .......................................... 715/201–204, 264
See application file for complete search history.

(56) References Cited

U.S. PATENT DOCUMENTS

| | | | |
|---|---|---|---|
| 4,599,719 A | 7/1986 | Breen et al. | |
| 4,653,044 A | 3/1987 | Kudo | |
| 4,771,417 A | 9/1988 | Maxwell et al. | |
| 4,893,305 A | 1/1990 | Fernandez et al. | |
| 4,897,831 A | 1/1990 | Negi et al. | |
| 5,678,039 A * | 10/1997 | Hinks et al. | G06F 9/4448 |
| 5,805,153 A * | 9/1998 | Nielsen | 725/37 |
| 6,018,742 A * | 1/2000 | Herbert, III | G06F 9/4448 |
| 6,345,147 B1 | 2/2002 | Mimura et al. | |
| 6,904,263 B2 * | 6/2005 | Grudnitski et al. | 434/308 |
| 7,050,109 B2 | 5/2006 | Safadi et al. | |
| 7,779,058 B2 * | 8/2010 | Shea | G06F 21/10 707/705 |
| 9,407,963 B2 * | 8/2016 | DeShan | G06F 17/3082 |
| 2001/0029583 A1 * | 10/2001 | Palatov et al. | 713/193 |
| 2001/0030710 A1 * | 10/2001 | Werner | 348/467 |
| 2002/0122136 A1 | 9/2002 | Safadi et al. | |
| 2003/0110449 A1 * | 6/2003 | Wolfe | G06F 17/2247 715/236 |

(Continued)

FOREIGN PATENT DOCUMENTS

WO    WO2008032184 A2    3/2008

OTHER PUBLICATIONS

"Windows Media Connect FAQ" © 2005 Microsoft Corporation, Archived Apr. 27, 2005 http://www.microsoft.com/windows/windowsmedia/devices/wmconnect/faq.aspx.*

(Continued)

*Primary Examiner* — Kavita Padmanabhan
*Assistant Examiner* — Tyler Schallhorn
(74) *Attorney, Agent, or Firm* — Lowenstein Sandler LLP (57) ABSTRACT

The present invention relates to video provided over one or more networks. Methods and systems for providing, playing, and/or editing video having multiple tracks of timed text are provided in different embodiments of the present invention.

21 Claims, 12 Drawing Sheets (56) References Cited

U.S. PATENT DOCUMENTS

| | | | | |
|---|---|---|---|---|
| 2003/0163818 A1* | 8/2003 | Armstrong et al. | ............ | 725/61 |
| 2005/0010409 A1* | 1/2005 | Hull et al. | ................... | 704/243 |
| 2005/0091681 A1* | 4/2005 | Borden et al. | ................. | 725/31 |
| 2005/0108026 A1 | 5/2005 | Brierre et al. | | |
| 2006/0259588 A1* | 11/2006 | Lerman et al. | ............... | 709/219 |
| 2006/0259589 A1* | 11/2006 | Lerman et al. | ............... | 709/219 |
| 2006/0267995 A1* | 11/2006 | Radloff | ............... | G11B 27/105 345/530 |
| 2006/0271977 A1* | 11/2006 | Lerman et al. | ................. | 725/88 |
| 2007/0211169 A1* | 9/2007 | Sigvaldason | ................ | 348/468 |
| 2007/0282675 A1 | 12/2007 | Varghese | | |
| 2008/0052630 A1* | 2/2008 | Rosenbaum | ...... | G06F 17/30864 715/738 |
| 2008/0228821 A1* | 9/2008 | Mick | ....................... | G06F 21/10 |
| 2008/0229371 A1* | 9/2008 | Mick | ....................... | G06F 21/10 725/87 |
| 2008/0229374 A1* | 9/2008 | Mick | ....................... | G06F 21/10 725/93 |
| 2008/0247543 A1* | 10/2008 | Mick | ....................... | G06F 21/10 380/201 |
| 2008/0250120 A1* | 10/2008 | Mick | ....................... | G06F 21/10 709/219 |
| 2009/0070673 A1 | 3/2009 | Barkan et al. | | |
| 2009/0083462 A1* | 3/2009 | Song et al. | ................... | 710/105 |
| 2010/0138852 A1* | 6/2010 | Hirsch et al. | ................. | 725/13 |
| 2010/0169786 A1* | 7/2010 | O'Brien | ............ | G06F 17/30817 715/738 |

OTHER PUBLICATIONS

Overstream, Inc.; "About Overstream.net: Official"; 2007. Downloaded from http://www.overstream.net/aboutoverstream_official.php on Oct. 26, 2007.

About.com: Deafness, "Accessibility-Web Video Captioning Technologies," http://deafness.aboutcom/cs/accessibility/a/webvideo.htm, Nov. 2, 2007, Downloaded from Wayback Machine (web.archive.org) on Apr. 29, 2011, 2 pages.

"Project ReadOn: How it works," http://www.projectedreadon.com/index.php?pg=howitworks. Mar. 3, 2008. Downloaded from Wayback Machine (web.archive.org) on Apr. 28, 2011, 1 page.

"Project ReadOn: Home Page," http://www.projectreadon.com. Oct. 31, 2007. Downloaded from Wayback Machine (web.archive.org) on Apr. 29, 2011, 2 pages.

Overstream, Inc.; "Overstream—Welcome"; 2007. Downloaded from http://www.overstream.net/ on Nov. 9, 2007, (2 pages).

Overstream, Inc.; "What is Overstream?"; 2007. Downloaded from http://www.overstream.net/whatisoverstream.php on Nov. 9, 2007, (2 pages).

Overstream, Inc.; "Browse Overstreams"; 2007. Downloaded from http://www.overstream.net/browse.php on Nov. 9, 2007, (4 pages).

Overstream, Inc.; "Overstream Help"; 2007. Downloaded from http://www.overstream.net/help.php on Nov. 9, 2007, (2 pages).

Thomas, Keir. "Beginning SUSE Linux, Second Edition" Nov. 9, 2006, Apress.

* cited by examiner

Video Status | Upload Video

Video Status

| Needs Action (0) | All (8) | Processing (0) | Rejected (0) | Failed (0) | Live (8) |

8 Videos - These are all the videos in your account. Click on the "Action" links for any video to change its video information.

| Video Filename | Title | Status | Date Uploaded | Actions |
|---|---|---|---|---|
| ☐ avi_6351.avi | Test pattern | Live - View | Apr 30, 2007 | Edit Video Info >> Captions/Subtitles: [Add] [Select one] ▼ [Edit] [Delete] |
| ☐ newvideotesting2.wmv | newvideotesting2 | Live - View | Apr 20, 2007 | Edit Video Info >> Captions/Subtitles: [Add] German: demo-2 ▼ [Edit] [Delete]  }810 |
| ☐ testingnewvideo.wmv | testingnewvideo | Live - View | Apr 20, 2007 | [select one] English:Original French:demo-2 German:demo-2 [Edit] [Delete] |
| ☐ TestVeryAngryCat.avi | Angry CAT Linux | Live - View | Apr 18, 2007 | Chinese:simplified Russian:demo-2 Spanish:demo-2 Dutch:demo-2 [Delete] —812 |
| ☐ Funnycats3.mp4 | Test Mac Inapporiate | Live - View | Apr 13, 2007 | Greek Italian Portuguese Korean [Edit] [Delete] |
| ☐ helpcentervide_final2.avi | What is a codec? | Live - View | Sep 26, 2006 | Arabic Japanese Hebrew |
| ☐ helpcentervide_final2.avi | What is a codec? | Live - View | Sep 13, 2006 | Chinese:tradional Captions/Subtitles: [Add] |
| ☐ CRS-2006.04.03.mpg | test | Live - View | Apr 5, 2006 | Edit Video Info >> Captions/Subtitles: [Add] [Select one] ▼ [Edit] [Delete] |

[Delete Videos >>]

1-8 of 8 videos

Notes:
- We conduct a limited pre-screening of videos for compliance with our policies
- Any changes you make to "Live" videos, including deleting them, will take several hours to be reflected on the site.

©2007 Google - Google Video Home - Contact Us - Discuss - Privacy Policy - Terms of Service

GRAPHICAL USER INTERFACE FOR MANAGEMENT OF REMOTELY STORED VIDEOS, AND CAPTIONS OR SUBTITLES THEREOF

BACKGROUND OF THE INVENTION

Field of the Invention

The present invention relates to video provided over a network.

Background Art

Video is increasingly being accessed by remote users over networks, such as the Internet. The rise of the World Wide Web including various web applications, protocols, and related networking and computing technologies has made it possible for remote users to view and play video. Video services that allow users to search different videos and select videos through a browser have become increasing popular.

Video content often includes an audio component, such as, speech, music, and other sound. Timed text (TT), such as captions or subtitles, is sometimes provided with video content. Such timed text can be helpful to those who are deaf or hard of hearing, or who are in environments where it is difficult or not permitted to hear audio, or to those whom the audio is not in their native language.

In broadcast video or video professionally produced and distributed on DVD or other formats, sophisticated techniques have been used by video producers or professional caption companies to add captions in one or more languages. These techniques involve embedding or adding captions at the time a video is created prior to distribution. At playback a user is limited to what captions are present on the DVD.

Unlike broadcast video, online video is often produced by a wide range of sources and people. This can include a person with a video camera having no captioning capability or skill. Accordingly, much of the online video content available today does not include timed text. To add timed text requires the services of an expensive professional captioning service and essentially amounts to redistributing the video with timed text. This is expensive, slow, and impractical for many online videos. Even in cases where an online video is produced and distributed with a track of timed text, it is often only provided by the video producer in one language which may not suit a large number of remote users having different native languages. Current online video players and services do not customarily provide for the display of multiple tracks of timed text.

What are needed are new systems and methods for providing, playing, and/or editing of online video that can accommodate multiple tracks of timed text.

BRIEF SUMMARY OF THE INVENTION

The present invention relates to video provided over one or more networks. Methods and systems for providing, playing, and/or editing video having multiple tracks of timed text are provided in different embodiments of the present invention.

Further embodiments, features, and advantages of the invention, as well as the structure and operation of the various embodiments of the invention are described in detail below with reference to accompanying drawings.

BRIEF DESCRIPTION OF THE DRAWINGS

The present invention will be described with reference to the accompanying drawings, wherein like reference numbers indicate identical or functionally similar elements. Also, the leftmost digit(s) of the reference numbers identify the drawings in which the associated elements are first introduced.

FIGS. 8A and 8B are screen captures showing an example user-interface panel for managing a set of video files available for editing of associated timed text tracks according to an embodiment of the present invention.

DETAILED DESCRIPTION OF EMBODIMENTS OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which the invention would be of significant utility.

The present invention relates to video provided over one or more networks. Methods and systems for providing, playing, and/or editing video having multiple tracks of timed text (TT) are provided in different embodiments of the present invention.

The term "timed text" refers to textual information that is intrinsically or extrinsically associated with timing information. Examples of timed text can include, but are not limited to, captions or subtitles. A "track" of timed text refers to a composition of timed text data intended to be used in a period of video playback.

Providing and Playing Video Having Multiple Tracks of TT Over a Network

Figure 1A:
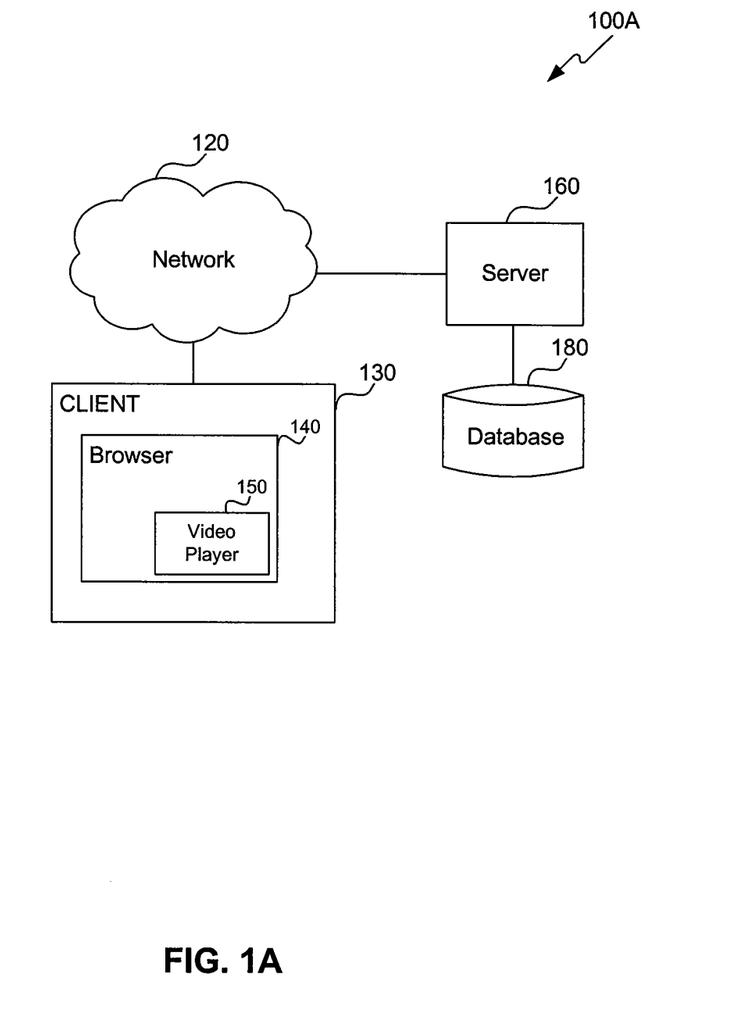
FIG. 1A is a diagram of a system for providing and playing multiple tracks of timed text according to an embodiment of the present invention.

FIG. 1A shows a system 100A for providing and playing multiple tracks of timed text according to an embodiment of the present invention. System 100A includes a client 130 and server 160. Client 130 can be coupled to server 160 over a network 120. One or more databases 180 can be coupled to server 160. Network 120 can be one or more computer and/or telephony networks, or combinations of networks.

Network 120 can be a local area network (LAN), medium area network, or wide area network, such as, the Internet. One client 130 and one server 160 are shown for clarity, and indeed many remote clients 130 can be coupled to one or more servers 160.

Client 130 can include a browser 140 and video player 150. In one example, video player 150 can be part of or embedded with browser 150. In another example, video player 150 can be separate but coupled to communicate with browser 140. Video player 150 can be a custom player, or can be used in combination with a known FLASH player or other type of video player, or can be a modification of a known FLASH player or other type of video player. Server 160 can further include or be coupled to a web server (not shown) to support web protocols and communication with remote browser 140.

According to a feature, video player 150 and server 160 can communicate to allow video player 150 to play video having multiple tracks of timed text over network 120 to a remote user at client 130. The operation of server 160 and video player 150 and other components of system 100A are further described below with respect to methods and examples in FIGS. 2-5. For exemplary purposes server 160 is described as a single server. However, system 100A is not limited to this implementation and server 160 can be implemented in any number of servers.

Figure 2:
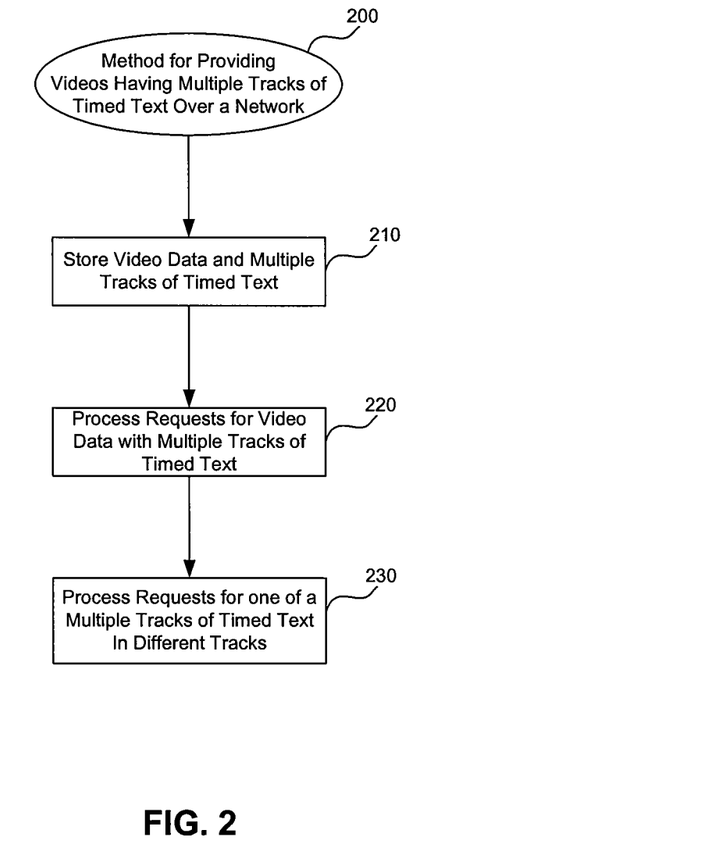
FIG. 2 is a flow diagram of a method for providing videos having multiple tracks of timed text over a network according to an embodiment of the present invention.

FIG. 2 is a flow diagram of a method 200 for providing videos having multiple tracks of timed text over a network according to an embodiment of the present invention (steps 210-230). In step 210, video data and multiple tracks of timed text associated with respective video data are stored in database 180. Video data may be stored along with the multiple tracks of TT in the same database 180 or on different databases at the same or different locations. Any type of database (including but not limited a relational database, or other data structure or service) may be used to store video data and/or associated multiple tracks of timed text. Further, database 180 can be stored on one or more storages devices. These storages devices can be locally or remotely coupled to one another and to server 160. As an alternative to the storing in step 210, video data may be generated dynamically or streamed from a video streaming source. Video data may be provided in any suitable video format including, but not limited to, video formats associated with video content incorporated in files or streams.

In step 220, server 160 processes requests for video data with multiple tracks of TT. These requests can be received over network 120 from client 130. Server 160 retrieves multiple tracks of TT, and returns multiple tracks of TT to video player 150 for viewing by the remote user. An initial track of timed text may also be sent.

The amount of data sent regarding the multiple tracks of TT can vary in different embodiments depending upon how much data is desired to be sent, the available bandwidth, storage capacity at client 130, or other design preference or need. In one example, a track list having metadata, such as track name and language for all the multiple tracks, but no timed text is provided to the video player 150. Timed text is then provided when specifically requested by video player 150. (An example operation of server 160 and video player 150 with a track list is described further below with respect to FIG. 4).

In another example, a track list having metadata, such as track name and language for all the multiple tracks, and timed text for an initial track (or set of initial tracks) is provided to the video player 150. This initial track (or set of initial tracks) can be identified by the server 160 (or by video player 150) based on user preference, language preference, a default value, or other criteria. Timed text for different tracks is then provided when specifically requested by video player 150 as described below with respect to step 230. In another example, a track list can be provided having metadata, such as track name and language for multiple tracks, along with timed text for all tracks. In this example, client 130 receives timed text for multiple tracks more quickly but may store more timed text data than needed by a particular user.

The metadata on multiple tracks above is illustrative and not intended to be limiting. Other metadata and combinations of metadata can be used. In another example, metadata can include a format type that identifies a type of format. In one embodiment, two independent kinds of format metadata can be used. A source format identifying a data format of uploaded data and a serving format identifying a data format for a track served to a video player.

In one example, server 160 retrieves only multiple tracks of timed text as described above. Video data itself associated with the multiple tracks of TT can be streamed separately by a different server or otherwise uploaded separately to a client device 130.

In another example, in addition to retrieving the multiple tracks of timed text in step 220, server 160 can also retrieve the associated requested video data and return the requested video data and multiple tracks of TT to video player 150 for viewing by the remote user.

In step 230, server 160 may process further requests for one or more selected tracks of TT. As mentioned above with respect to step 220, in cases where a track list was sent and an initial track of timed text was sent, a user may request a different track of timed text. These requests can be received over network 120 from client 130. Server 160 then retrieves the timed text for the requested track, and returns the requests TT to video player 150 for viewing by the remote user.

These examples are illustrative and not intended to necessarily limit the present invention. Different metadata and track lists may be used as would be apparent to person skilled in the art given this description.

Figure 3:
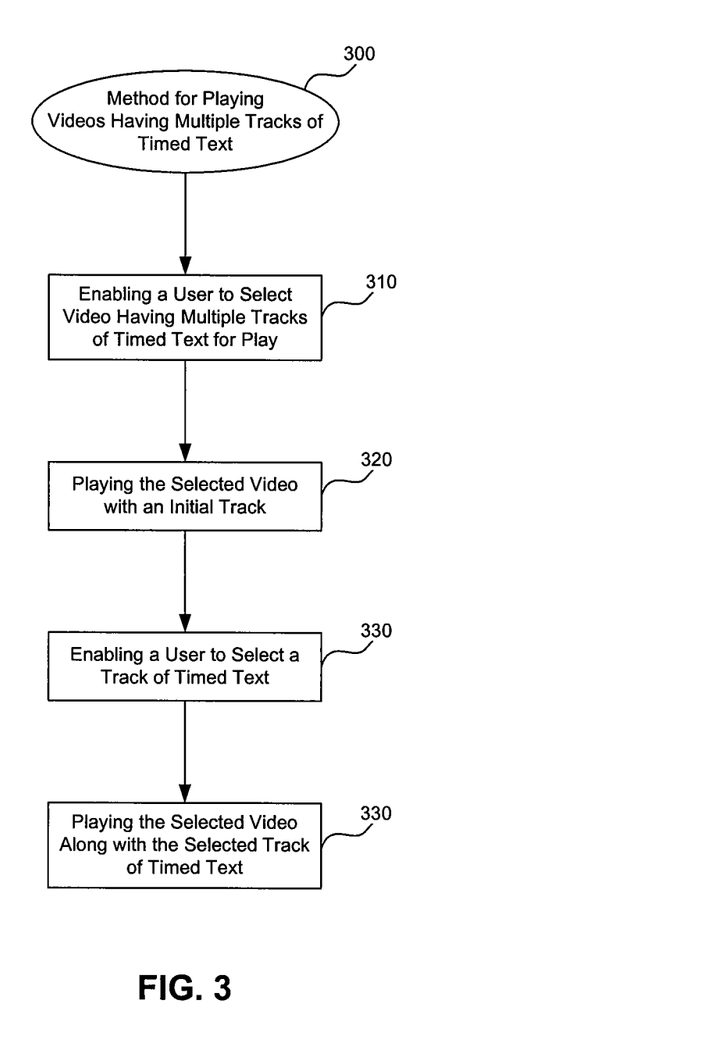
FIG. 3 is a flow diagram of a method for playing videos having multiple tracks of timed text received over a network according to an embodiment of the present invention.

FIG. 3 is a flow diagram of a method 300 for playing videos having multiple tracks of timed text over a network according to an embodiment of the present invention (steps 310-340). In step 310, browser 140 may enable a user to select video data having multiple tracks of timed text. For instance, a user may direct browser 140 to a web site supported by server 160 that makes available video data. This web site can list or support search of video data available over network 120. A user can select a desired video through a user-interface at client 130 for play by video player 150. Video player 150 then sends a request to server 160 for the requested video. In other examples, step 310 may be carried out by video player 150 itself or the combination of browser 140 and video player 150.

In step 320, video player 150 plays the selected video and an initial track of timed text. For instance, client 130 may receive a video and at least one track of timed text to fulfill a video file request. Client 130 then stores the received video and any track metadata including at least one initial track of timed text. Video player 150 then plays the received video and at least one initial track of timed text for viewing by the user. In one example, video player 150 automatically determines an appropriate location for the timed text to be displayed relative to the video being played. This can be based on different parameters, if known, such as one or more of window size, aspect ratio of the video, user preference, or default value.

Figure 5:
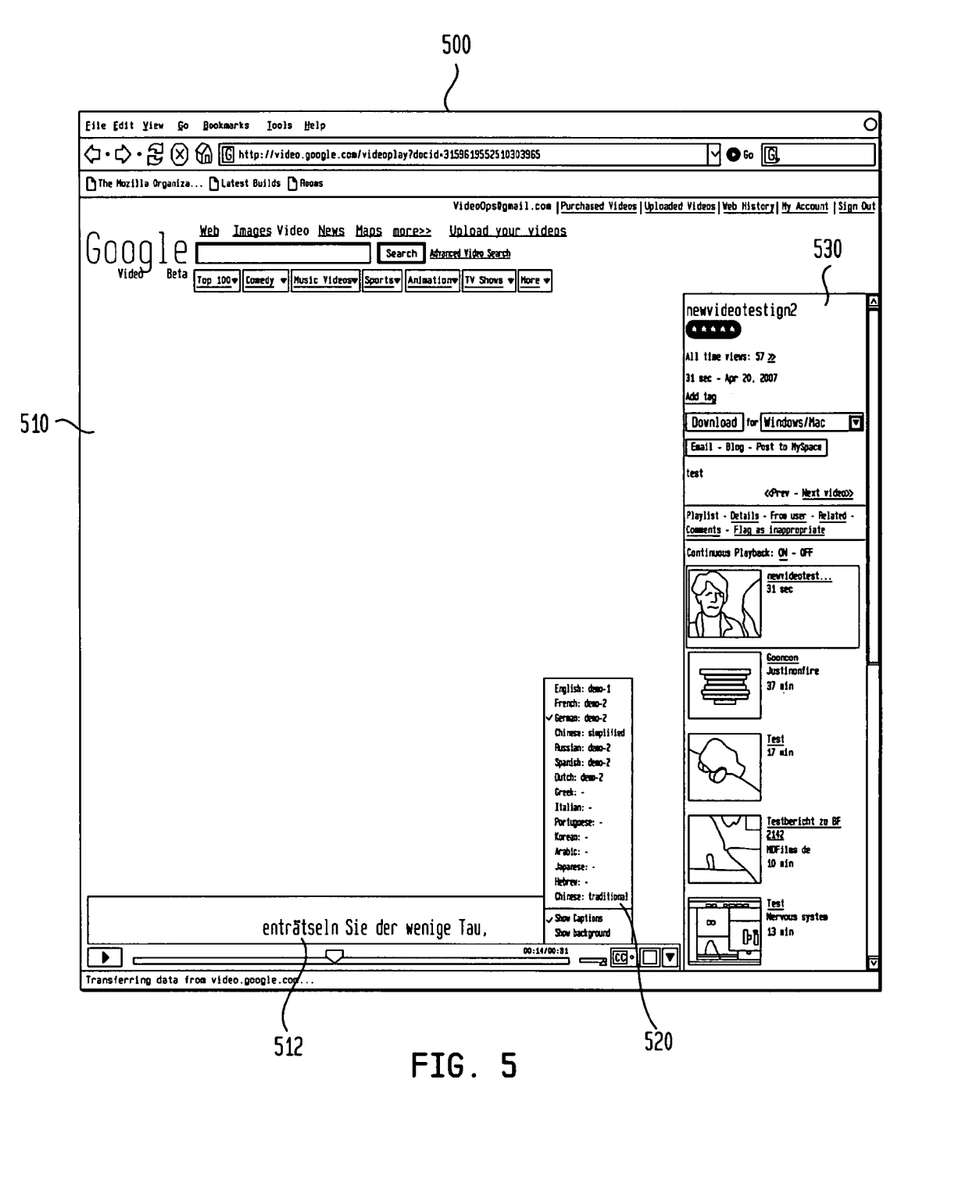
FIG. 5 is a screen capture of an example window for playing online video having multiple tracks of timed text according to an embodiment of the present invention.

FIG. 5 shows an example window 510, timed text 512, and panel 520 that a video player 150 may provide within a window 500 generated by browser 140. Window 510 displays the video associated with the video played in steps 320. Timed text 512 is displayed at or near the video playing in window 510. Timed text 512 can be the TT for the initial track played in step 320 as describe above. In one example, TT 512 can be displayed underneath window 510 as shown in FIG. 5. In another example, TT 512 can be displayed by video player 150 on top (or embedded within) the video playing in window 510. Panel 520 may be also displayed to show metadata (such as track name and language for all multiple tracks) associated with a received track list. The initial track metadata associated with TT 512 may be highlighted by a check or other indication (see "German: demo-2" highlighted with a check in the example in FIG. 5). An optional panel 530 may be provided which includes further indicia and/or control elements. Example indicia may be information about the length of time of the video, video rating information, and number of times it has been played. Example control elements may be buttons to add a tag, download for a particular computing or operating system platform, display a playlist, flag as inappropriate, check sender "from user" information, view related comments, toggle continuous playback, or select other videos.

In step 330, video player 150 may further enable a user to select a track of timed text. For instance, video player 150 may select to view panel 520 and select a different track in panel 520 than the highlighted track. For instance, a user may select the track named "Chinese:traditional" in panel 520. Video player 150 then sends a request for this track of TT to server 160. Alternatively, video player 150 may first check to see whether requested track of TT has been previously loaded and stored at client 130.

In step 340, video player 150 plays the requested track of TT. For instance, client 130 may receive and store the requested track of TT. Video player 150 then retrieves the requested track of TT from memory in client 130 and displays the requested track of TT in place of any initial track of TT.

Example Process Flow

Figure 4:
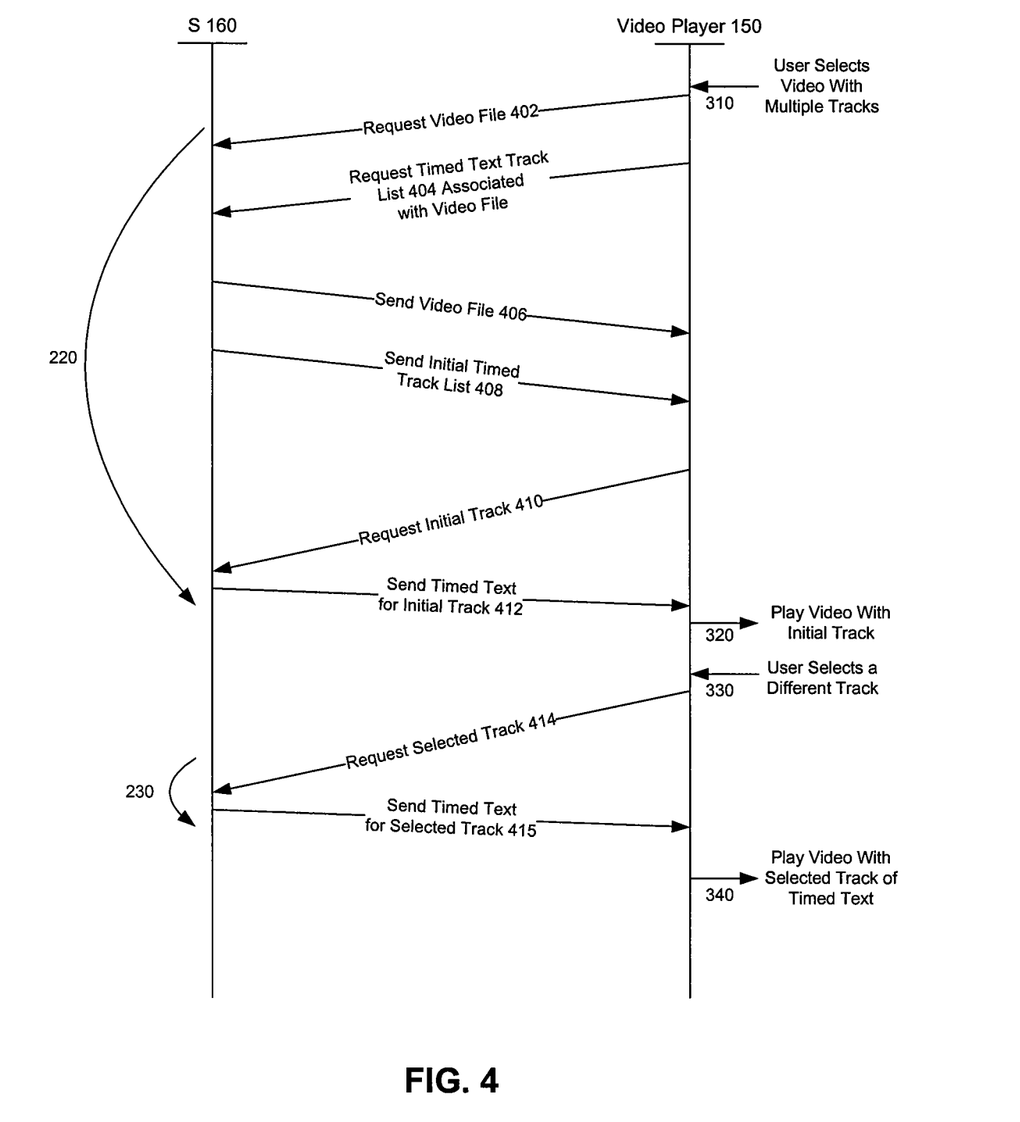
FIG. 4 is a diagram showing an example operation of providing and playing videos having multiple tracks of timed text over a network according to an embodiment of the present invention.

FIG. 4 shows an example process flow for providing and playing videos having multiple tracks of timed text over a network according to a further embodiment of the present invention. In particular, this process flow shows in further detail how server (S) 160 and video player 150 operate with one another in the above example involving a track list.

First, a user may select a video with multiple tracks of TT as described above with respect to step 310. Video player 150 may send a request for video data 402 to S 160. Video player 150 may also send a request for a timed text track list 404 to S 160. These requests 402, 404 can be separate or part of a single request.

As described above with respect to step 220, S 160 processes request 402 and sends the requested video data 406 to video player 150. S 160 processes request 404 and sends an initial track list 408 (i.e., a track list having the metadata identifying what tracks the video does have.) to video player 150.

If a user has selected a closed captioning condition to be on, video player 150 may send a request for an initial track of TT 410 to S 160. S 160 then sends the requested timed text 412 for the initial track. Video player 150 plays the requested video and the initial track of TT as described above with respect to 320. In an embodiment, S 160 need not serve video data requested in request 402 itself. Instead the video may be streamed from a separate server (not shown). Such a separate server (or combination of servers) can be responsible for handling requests for video data and serving the video data to one or more client devices 130, and in particular to one or more video players 150.

A user may select a different track at video player 150 as described with respect to step 330. Video player 150 then sends a request for the selected track of TT 414 to S 160. S 160 then sends TT for the selected track 415 to video player 150. Video player 150 may then play the selected different track of TT in place of the initial track of TT.

These examples are illustrative and not intended to necessarily limit the present invention. Different metadata and track lists may be used as would be apparent to person skilled in the art given this description.

Editing Video Having Multiple Tracks of Timed Text Over a Network

According to a further feature, remote editing of online video having multiple tracks of timed text is provided. "Editing timed text" as used herein broadly refers to adding timed text, deleting timed text, and/or changing timed text.

Figure 1B:
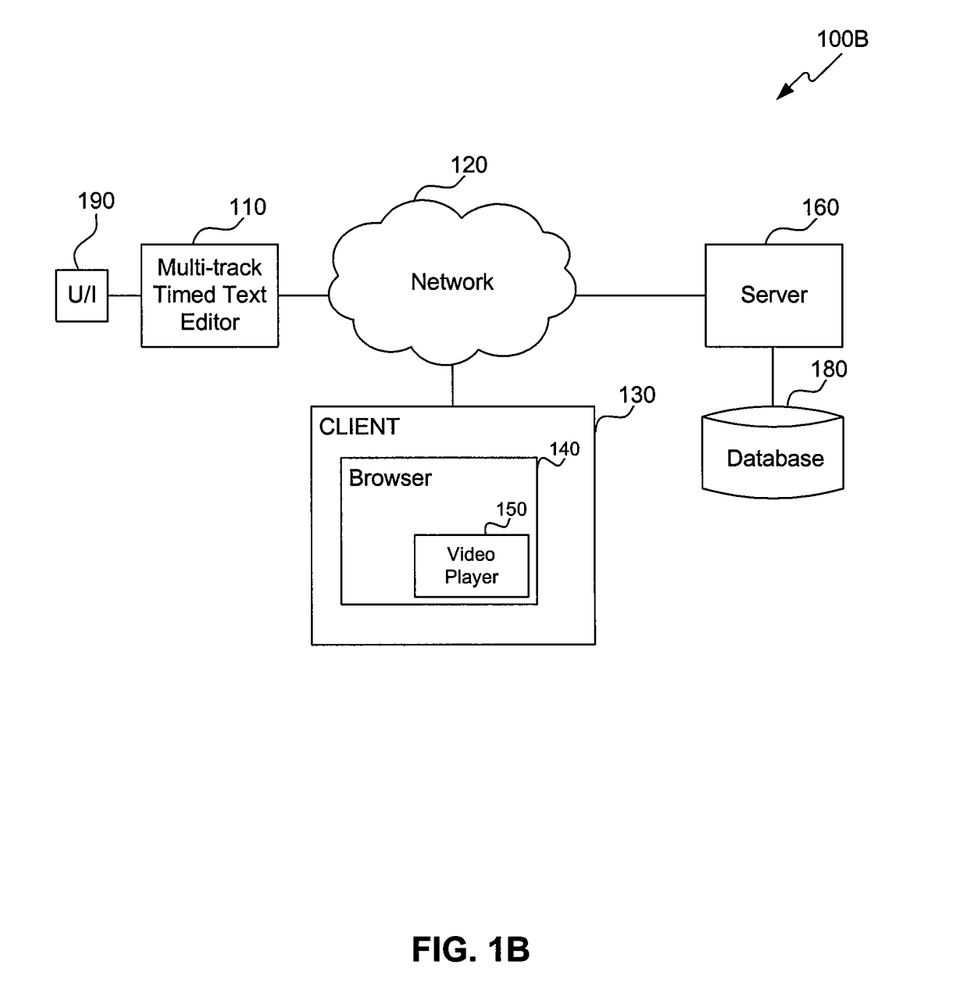
FIG. 1B is a diagram of the system of FIG. 1A further including a system for editing online video having multiple tracks of timed text according to another embodiment of the present invention.

As shown in FIG. 1B, in one embodiment, a system 100B for editing online video having multiple tracks of timed text includes a multi-track timed text editor 110 coupled to network 120. A user-interface 190 can be coupled to multi-track timed text editor 110. Multi-track timed text editor 110 and U/I 190 can be part of any client device (not shown) capable of communicating over network 120 with server 160.

Multi-track timed text editor 110 communicates with server 160 to enable a user to edit timed text in multiple tracks of associated video files. One or more panels or other control elements may be provided to a user. In one example, a browser is provided as part of or coupled to editor 110. In this way, a user can access editor 110 through the browser to view and provide control inputs. U/I 190 can be any type of U/I that allows a user to interface with a browser and/or editor 110 to carry out editing of video having multiple tracks of TT over network 120. Operation of editor 110 is described further with respect to FIGS. 6-8B.

Figure 6:
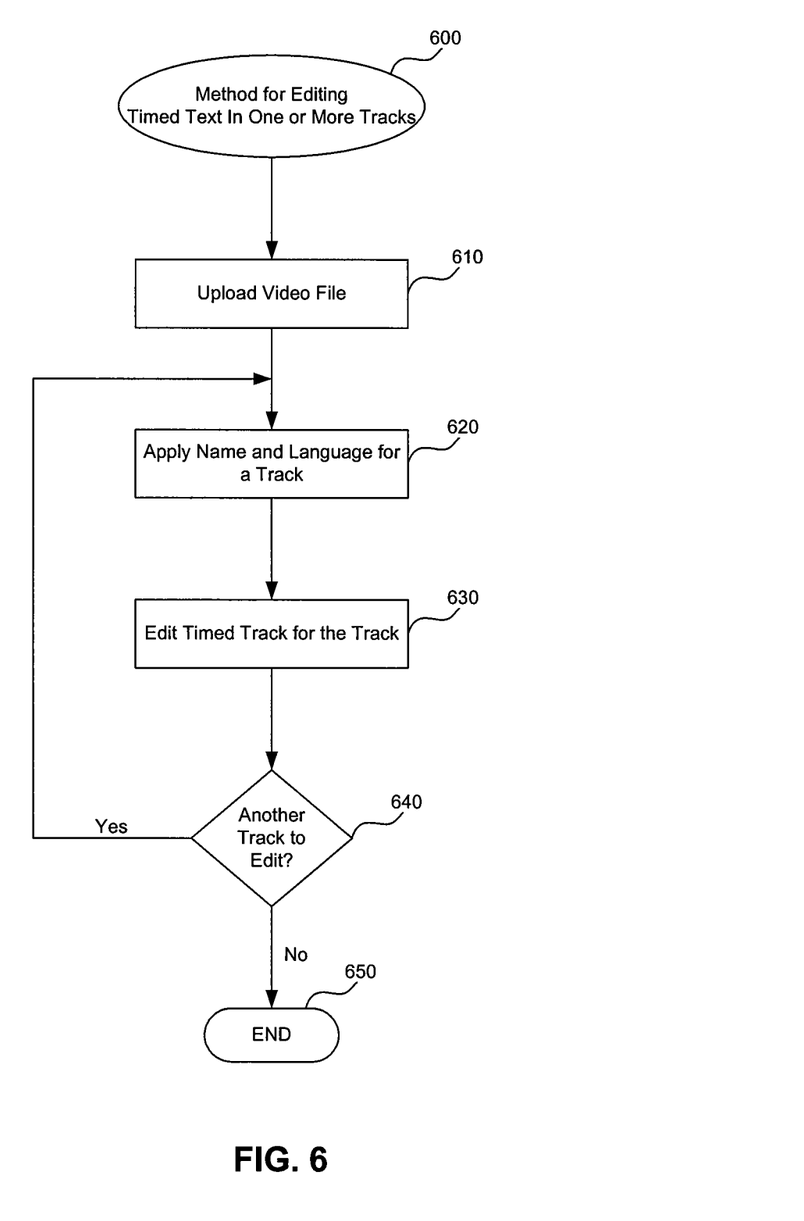
FIG. 6 is a flow diagram of a method for editing videos having multiple tracks of timed text over a network according to an embodiment of the present invention.

A method 600 for editing timed text in one or more tracks according to an embodiment is shown in FIG. 6. A user uploads video data (such as a video file or stream) (step 610). For example, a user may surf with a browser to web site supported by server 160. A control element (such as a panel) may be displayed to the user to allow the user to select a video file. S 160 then sends the selected video file and associated metadata to editor 110 over network 120. Associated metadata may include, for example, video length, video rating information, number of times video played, or other information.

In step 620, a user applies a track name and language of an initial track of TT. The name can be any identifying name the user associates with the initial track. The language can be the language of the timed text. In the example of the system 100B, a user can input the name and language through U/I 190. Multi-track timed text editor 110 then stores the name and language as metadata associated with the initial track (step 620). For instance, editor 110 may create a track list that includes the metadata (name and language for the initial track). Other metadata (such as format) can be edited as well.

In step 630, a user may further edit any timed text for the initial track. This can include editing timed text corresponding to snippets (timed segments) of the video through multi-track timed text editor 110.

In an embodiment, if a user wishes to edit another track (step 640), then steps 620 and 630 may be repeated, otherwise the method ends (step 650).

An example web-based implementation of a multi-track TT editor 110 according to an embodiment of the present invention is further described with respect to example windows 700 and 800 depicted in FIGS. 7A through 7C, 8A and 8B. These windows are illustrative and not intended to limit the present invention.

Figure 7A:
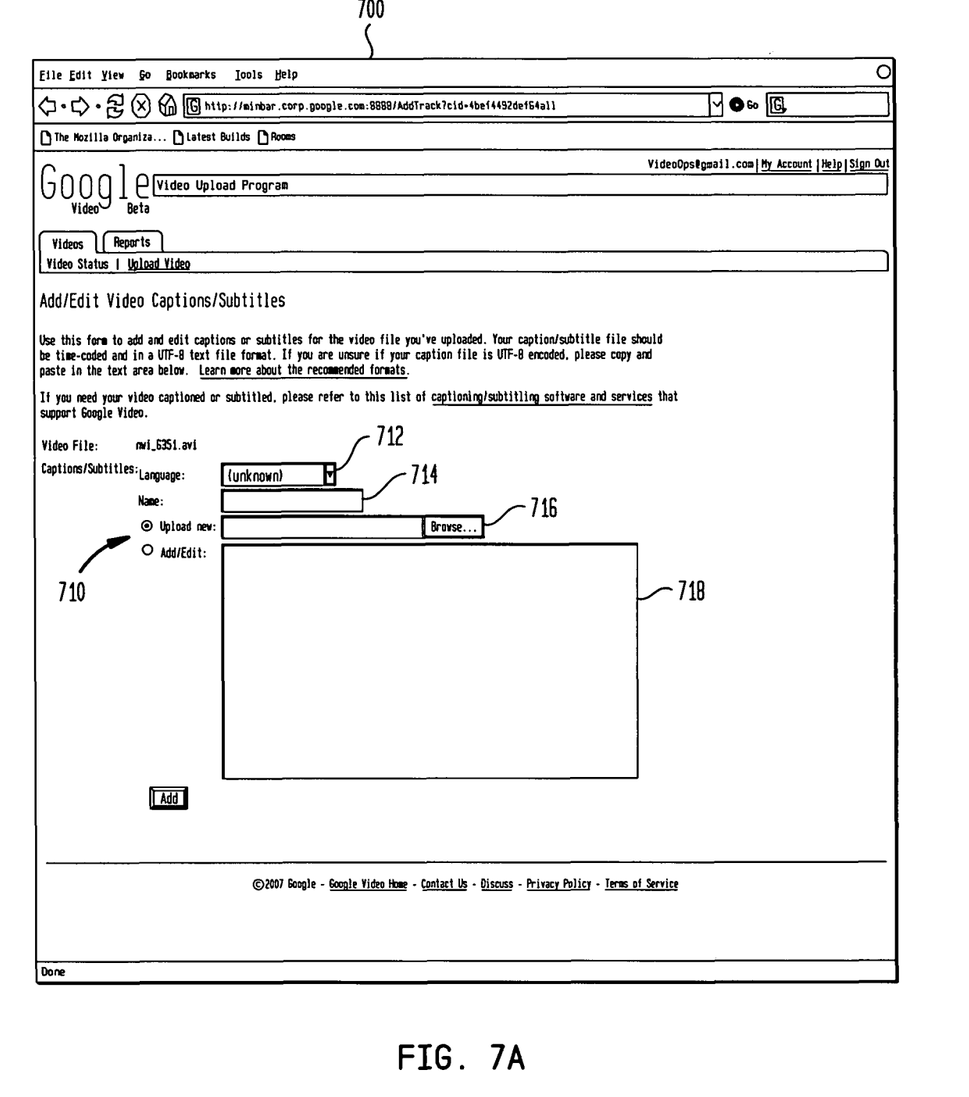
FIGS. 7A to 7C are screen captures showing an example user-interface panel for editing multiple timed text tracks in a status window according to an embodiment of the present invention.

As shown in FIG. 7A, when a user wants to create a new caption track, he or she can open input window 700 as depicted in FIG. 7A. In one example, window 700 may be presented by editor 110 through a browser to the user. Input window 700 may contain editing region 710. Editing region 710 may include, but is not limited to, control elements 712, 714, 716 and 718. Control elements 712, 714, 716 and 718 may include buttons, dropdown menus, links, or other U/I control elements known in the art.

Figure 7B:
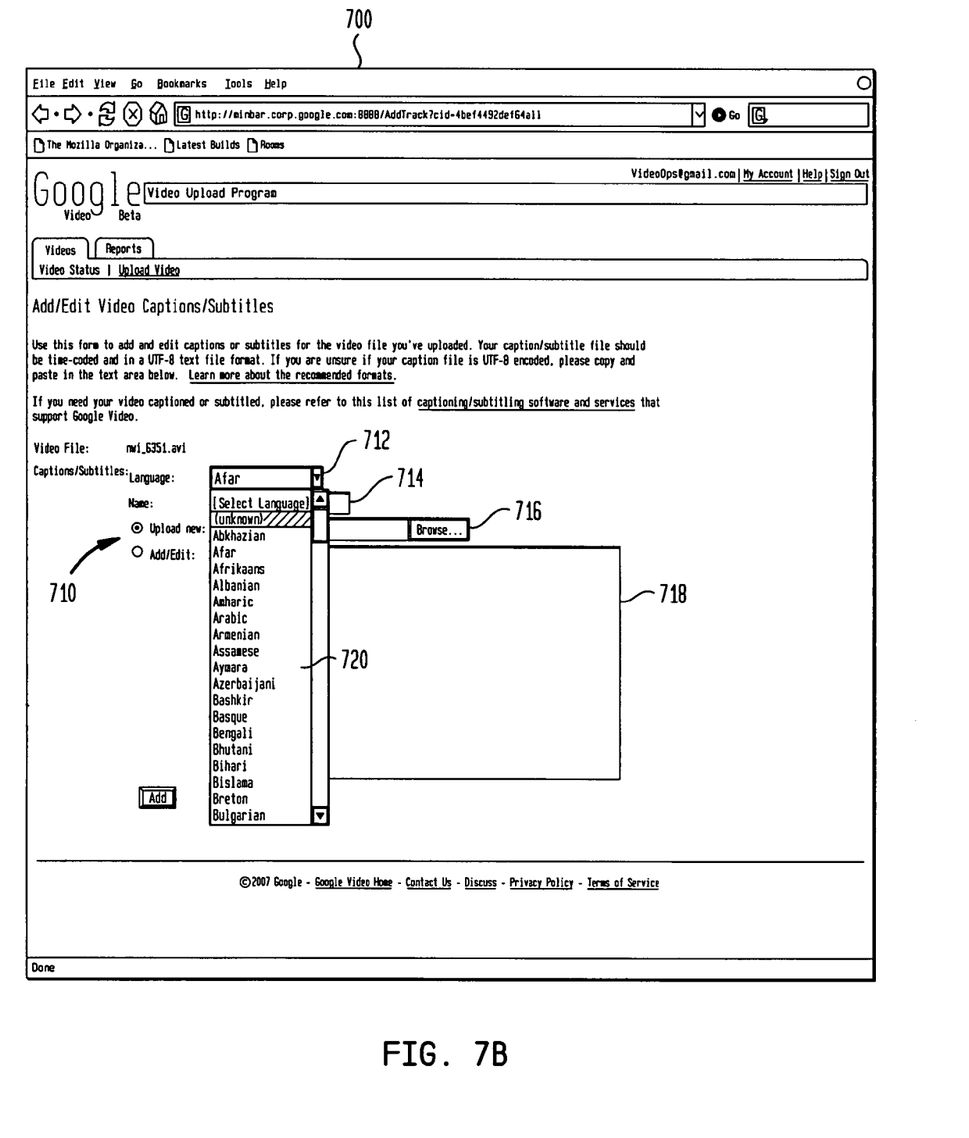
Figure 7C:
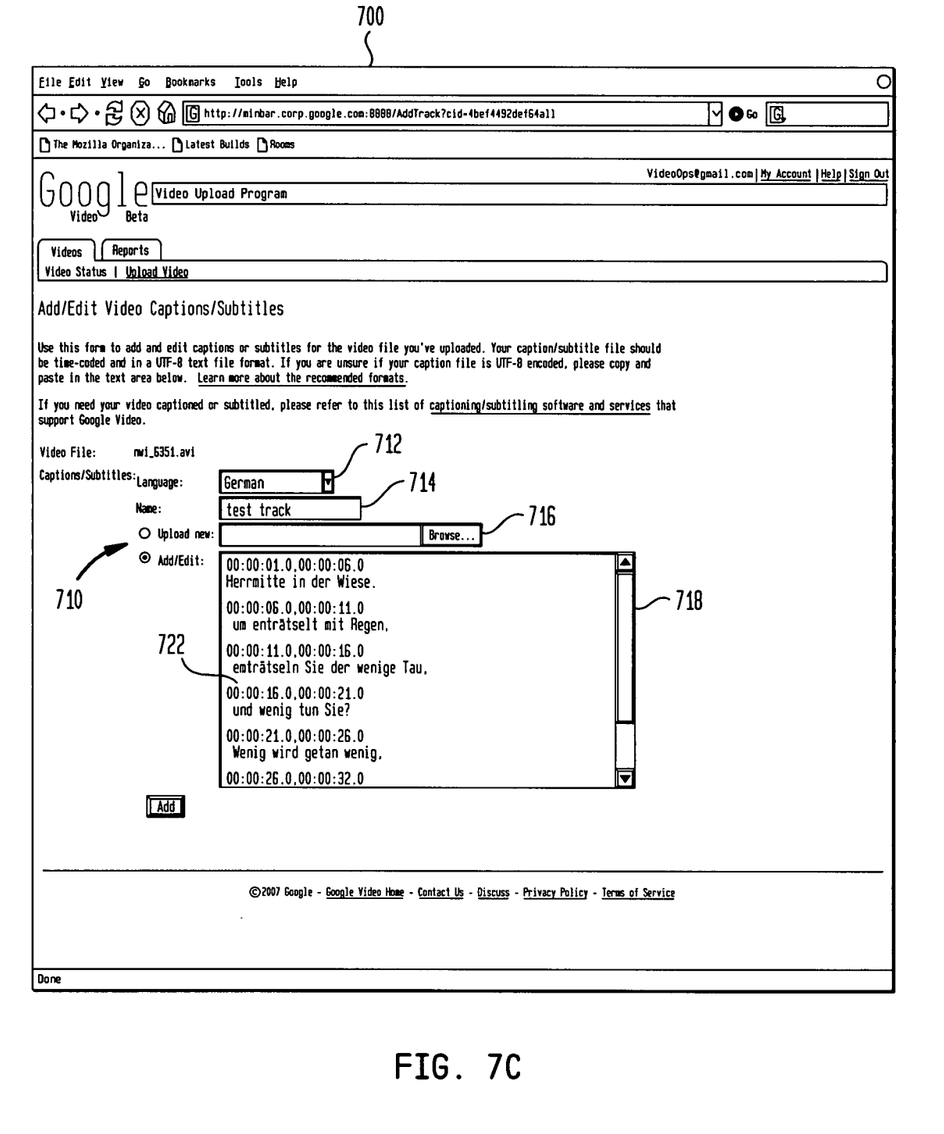

Control element 712 may allow the user to select a language. For example, control element 712 may be a drop down listing 720 of languages as depicted in FIG. 7B. Control element 714 allows a user to input a name for the timed text track. If a user has a text file for the video, he or she can upload it by using control element 716. Alternatively, a user can edit timed text information in a window 722 of control element 718 as depicted in FIG. 7C. In one example, timed text may be entered as alternating lines corresponding to lines of text a user wishes to have appear during the video playback (see e.g., window 720).

In a further example, editor 110 may further allow a user to manage collections of videos that have been uploaded for editing. FIG. 8A depicts an example window 800 that editor 110 may output. Window 800 contains a listing of a user's videos and the status thereof. A user may edit (add, edit, or delete) one or more of the multiple timed text tracks. Window 800 may contain action regions associated with respective video files. For example, action region 810 may include, but is not limited to, various control elements for the second video listed in window 800. Some control elements may include buttons, dropdown menus, and other control elements known in the art. FIG. 8B shows an example where a control element 812 is a drop down listing of the timed text tracks that are available for a given video.

In an embodiment, server 160 stores the timed text track edited by editor 110 in a portion of the video file on database 180. Alternatively, the timed text track may be stored in a separate file on database 180 and linked to the video. Once the timed text track is added to a video, a viewer of the video can then select to play the video with the submitted timed text track with a video player 150 as described above. S 160 can then send the video and timed text track for storage on client 130 for play by video player 150. S 160 can also stream video to the video player 150 for play.

Example Computer Implementation

Various aspects of embodiments of the present invention including systems 100A, 100B and components therein, such as, client 130, server 160, multi-track timed text editor 110, browser 140, and video player 150, can be implemented by software, firmware, hardware, or a combination thereof. Client 130, editor 110 and server 160 may each be implemented on any computing or processing device that supports network communication. Example computing or processing devices include, but are not limited to, a computer, workstation, distributed computing system, embedded system, stand-alone electronic device, networked device, mobile device, set-top box, television, or other type of processor or computer system. Further, the functionality of client 130, editor 110 and server 160 can be distributed across one or more computing or processing devices at the same or different locations.

Embodiments have been described above primarily with respect to web technology; however, the invention is not necessarily limited to the Web and can be used in other environments as would be apparent to person skilled in the art given this description. For instance, video player 150 can be run without use of a browser 140 and server 160 may be run without use of a web server.

Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A system comprising:
a memory; and
a processing device, coupled to the memory, to:
(a) provide, via a video list user interface, a list of videos of a remote user, the list of videos comprising a plurality of videos that each have one or more timed text tracks, each track of the one or more timed text tracks comprising a timed text and a first metadata indicating a language of the timed text and a second metadata indicating a name of the track, the video list user interface further comprising, for each video of the plurality of videos:
a first control element for a view action to view the video,
a second control element for a list action to view a track list comprising the one or more timed text tracks of the video, and to select a timed text track from the one or more timed text tracks, one or more additional control elements for additional actions to be performed on the selected timed text track, the additional actions comprising an edit action to edit the selected timed text track of the video, and an add action to add a new timed text track for the video;

(b) receive, via the one or more additional control elements of the video list user interface, an input from the remote user specifying one of the additional actions;

(c) responsive to determining that the input from the remote user specifies the edit action, present a multi-track timed text editor user interface for the remote user to edit the selected timed text track of the video; and (d) responsive to determining that the input from the remote user specifies the add action, present the multi-track timed text editor user interface for the remote user to add the new timed text track for the video, wherein the multi-track timed text editor user interface comprises a user interface element for inputting a language of the new timed text track, a user interface element for inputting a name of the new timed text track, and a user interface element for inputting a timed text of the new timed text track.

2. The system of claim 1, wherein the processing device is further to upload video data with the one or more timed text tracks over the network, and apply additional metadata for the one or more timed text tracks.

3. The system of claim 1, wherein the processing device is further to receive a second input from the remote user indicating a selection of multiple videos to delete, and delete the selected videos and timed text tracks associated with the selected videos in response to the second input.

4. The system of claim 1 wherein the processing device is further to enable the remote user to edit the first and second metadata of the selected timed text track.

5. The system of claim 1, wherein the processing device is further to create and store a video file capable of displaying text content of the selected timed text track at times specified by the selected timed text track.

6. The system of claim 1, wherein the processing device is further to create a video file that includes both the video and the edited timed text of the selected timed text track.

7. The system of claim 1, wherein the processing device is further to store the edited timed text of the selected timed text track in a separate file linked to a video file.

8. A computer-implemented method comprising:
providing, via a video list user interface, a list of videos of a remote user, the list of videos comprising a plurality of videos that each have one or more timed text tracks, each track of the one or more timed text tracks comprising a timed text and a first metadata indicating a language of the timed text and a second metadata indicating a name of the track, the video list user interface further comprising, for each video of the plurality of videos:
a first control element for a view action to view the video,
a second control element for a list action to view a track list comprising the one or more timed text tracks of the video, and to select a timed text track from the one or more timed text tracks,
one or more additional control elements for additional actions to be performed on the selected timed text track, the additional actions comprising an edit action to edit the selected timed text track of the video, and an add action to add a new timed text track for the video;

receiving, via the one or more additional control elements of the video list user interface, an input from the remote user specifying one of the additional actions;

responsive to determining, by a processing device, that the input from the remote user specifies the edit action, present a multi-track timed text editor user interface for the remote user to edit the selected timed text track of the video; and responsive to determining, by the processing device, that the input from the remote user specifies the add action, present the multi-track timed text editor user interface for the remote user to add the new timed text track for the video, wherein the multi-track timed text editor user interface comprises a user interface element for inputting a language of the new timed text track, a user interface element for inputting a name of the new timed text track, and a user interface element for inputting a timed text of the new timed text track.

9. The method of claim 8, further comprising:
enabling the remote user to upload video data with the one or more timed text tracks over the network; and
enabling the remote user to apply additional metadata for the one or more timed text tracks.

10. The method of claim 8, further comprising:
receiving, via the video list user interface, a second input from the remote user indicating a selection of multiple videos to delete; and
deleting the selected videos and timed text tracks associated with the selected videos in response to the second input.

11. The method of claim 8, further comprising:
enabling, by the multi-track timed text editor user interface, the remote user to edit the first and second metadata of the selected timed text track.

12. The method of claim 8, further comprising creating and storing a video file capable of displaying text content of the selected timed text track at times specified by the selected timed text track.

13. The method of claim 8, further comprising creating a video file that includes both the video and the edited timed text of the selected timed text track.

14. The method of claim 8, further comprising storing the edited timed text of the selected timed text track in a separate file linked to a video file.

15. A non-transitory computer-readable storage medium including data that, when accessed by a processor, causes the processor to:
provide, via a video list user interface, a list of videos of a remote user, the list of videos comprising a plurality of videos that each have one or more timed text tracks, each track of the one or more timed text tracks comprising a timed text and a first metadata indicating a language of the timed text and a second metadata indicating a name of the track, the video list user interface further comprising, for each video of the plurality of videos:
a first control element for a view action to view the video,
a second control element for a list action to view a track list comprising the one or more timed text tracks of the video, and to select a timed text track from the one or more timed text tracks,
one or more additional control elements for additional actions to be performed on the selected timed text track, the additional actions comprising an edit action to edit the selected timed text track of the video, and an add action to add a new timed text track for the video;

receive, via the one or more additional control elements of the video list user interface, an input from the remote user specifying one of the additional actions;

responsive to determining that the input from the remote user specifies the edit action, present a multi-track timed text editor user interface for the remote user to edit the selected timed text track of the video; and responsive to determining that the input from the remote user specifies the add action, present the multi-track timed text editor user interface for the remote user to add the new timed text track for the video, wherein the multi-track timed text editor user interface comprises a user interface element for inputting a language of the new timed text track, a user interface element for inputting a name of the new timed text track, and a user interface element for inputting a timed text of the new timed text track.

16. The computer-readable storage medium of claim 15, the operations further comprising:
enabling the remote user to upload video data with the one or more timed text tracks over the network; and
enabling the remote user to apply additional metadata for the one or more timed text tracks.

17. The computer-readable storage medium of claim 15, the operations further comprising:
receiving a second input from the remote user indicating a selection of multiple videos to delete; and
deleting the selected videos and timed text tracks associated with the selected videos in response to the second input.

18. The computer-readable storage medium of claim 15, the operations further comprising modifying the first and second metadata of the selected timed text track.

19. The computer-readable storage medium of claim 15, the operations further comprising creating and storing a video file capable of displaying text content of the selected timed text track at times specified by the selected timed text track.

20. The computer-readable storage medium of claim 15, the operations further comprising creating a video file that includes both the video and the edited timed text of the selected timed text track.

21. The computer-readable storage medium of claim 15, the operations further comprising storing the edited timed text of the selected timed text track in a separate file linked to a video file.

\* \* \* \* \*